(12) United States Patent
Piper

(10) Patent No.: US 11,541,828 B2
(45) Date of Patent: Jan. 3, 2023

(54) CUSTOMIZABLE EXTERIOR VEHICLE PANELS

(71) Applicant: TOYOTA MOTOR ENGINEERING & MANUFACTURING NORTH AMERICA, INC., Plano, TX (US)

(72) Inventor: Peter C. Piper, Saline, MI (US)

(73) Assignee: TOYOTA MOTOR ENGINEERING & MANUFACTURING NORTH AMERICA, Plano, TX (US)

( * ) Notice: Subject to any disclaimer, the term of this patent is extended or adjusted under 35 U.S.C. 154(b) by 37 days.

(21) Appl. No.: 17/156,511

(22) Filed: Jan. 22, 2021

(65) Prior Publication Data

US 2022/0234522 A1 Jul. 28, 2022

(51) Int. Cl.
| | |
|---|---|
| *B60R 13/04* | (2006.01) |
| *B60R 13/02* | (2006.01) |
| *B62D 25/02* | (2006.01) |
| *B62D 21/15* | (2006.01) |
| *B60R 5/00* | (2006.01) |

(52) U.S. Cl.
CPC ............... *B60R 13/04* (2013.01); *B60R 5/00* (2013.01); *B60R 13/02* (2013.01); *B62D 21/15* (2013.01); *B62D 25/02* (2013.01)

(58) Field of Classification Search
CPC .......... B60R 13/04; B60R 5/00; B60R 13/02; B62D 21/15; B62D 25/02

USPC ..................................................... 296/187.03
See application file for complete search history.

(56) References Cited

U.S. PATENT DOCUMENTS

| | | | |
|---|---|---|---|
| 6,764,124 B2 * | 7/2004 | Tohda | B62D 29/002 |
| | | | 296/203.03 |
| 2003/0127285 A1 | 7/2003 | Claeys | |
| 2006/0087141 A1 | 4/2006 | Bruford | |
| 2015/0252618 A1 | 9/2015 | Levi | |
| 2018/0154743 A1 | 6/2018 | Rao | |
| 2018/0186294 A1 | 7/2018 | Koo | |
| 2020/0062185 A1 | 2/2020 | Scaringe | |

FOREIGN PATENT DOCUMENTS

WO      WO-2011010114 A1 *  1/2011    ............. B62D 21/10

\* cited by examiner

*Primary Examiner* — Pinel E Romain
(74) *Attorney, Agent, or Firm* — Sheppard, Mullin, Richter & Hampton LLP; Hector A. Agdeppa; Daniel N. Yannuzzi

(57) ABSTRACT

A customizable exterior panel assembly can include a customizable exterior panel which is configured to be selectively coupled to an inner panel of a vehicle and to a fastening joint of the vehicle. The customizable exterior panel can be selectively coupled to the inner panel by an attachment point of the customizable exterior panel. The fastening joint can effectuate selective coupling of the customizable exterior panel to the inner panel and selectively attaches to the attachment point of the customizable exterior panel for selective coupling of the customizable exterior panel by the attachment point to the fastening joint.

13 Claims, 5 Drawing Sheets

CUSTOMIZABLE EXTERIOR VEHICLE PANELS

TECHNICAL FIELD

The present disclosure relates generally to vehicle panels, and more particularly, to exterior vehicle panels which can be replaceable and customized with one or more accessories.

DESCRIPTION OF RELATED ART

Vehicle panel structures or assemblies, such as for door panels or quarter panels, generally include an outer or exterior panel and an inner or interior panel. In recent years, exterior panels made of resin have become widely used. Interior trim panels may also be part of vehicle door structures/assemblies, and are used to cover the interior-facing surface of the outer panel or interior panel. Interior trim panels may provide various features/functionality, e.g., house a cup holder or interior arm-rest, as well as provide a visually acceptable appearance within the vehicle.

In recent years, more functionality can be achieved of vehicles through after-market accessories which can require permanent modifications to the vehicle or negatively impact the vehicle's long term durability.

BRIEF SUMMARY OF THE DISCLOSURE

In accordance with various embodiments, customizable exterior panel assemblies and vehicle having customizable vehicle assemblies are provided.

Various embodiments disclosed herein can include a customizable exterior panel configured to be selectively coupled to an inner panel of a vehicle. The customizable exterior panel can be coupled to a fastening joint of the vehicle.

The fastening joint can effectuate selective coupling of the customizable exterior panel to the inner panel. The fastening joint can selectively attach to an attachment point of the customizable exterior panel for selective coupling of the customizable exterior panel by the attachment point to the fastening joint. The fastening joint can be shaped to distance the customizable exterior panel from the inner panel at a portion of the customizable exterior panel where the attachment point is incorporated. The fastening joint can provide at least one of impact force absorption and transference of the impact force from the customizable exterior panel through the customizable exterior panel.

In various embodiments, the customizable exterior panel can be shaped such that an aperture is formed between the inner panel and the customizable exterior panel. When the customizable exterior panel is selectively decoupled from the inner panel, the aperture can be accessible.

In various embodiments, the inner panel can include an interior trim panel of a vehicle.

The customizable exterior panel can include one or more accessories. The one or more accessories can include one or more of a step, ladder, small storage compartment, medium storage compartment, or large storage compartment. An accessory can be at least partially positioned closer to the inner panel of the vehicle than an apex of outer surface of the customizable exterior panel. The accessory can be configured to absorb an impact force from the exterior panel through the customizable exterior panel assembly. The accessory can be configured to transfer an impact force from the exterior panel through the customizable exterior panel assembly.

The accessory can include a step. The step can include one or more support surfaces positioned substantially perpendicular to an outer surface of the customizable exterior panel.

The accessory can include a storage compartment which includes one or more surfaces positioned substantially perpendicular to an outer surface of the customizable exterior panel. The storage compartment can include a compartment door pivotably attached to the customizable exterior panel.

In various embodiments, the customizable exterior panel can be shaped as a vehicle exterior panel. The customizable exterior panel can be shaped like a vehicle door. The customizable exterior panel can be shaped like a quarter panel.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
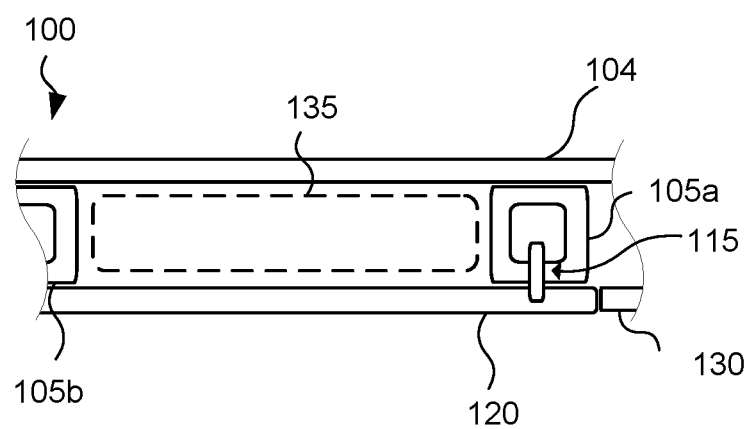
FIG. 1 shows a cut-away perspective view of a customizable exterior panel assembly for a vehicle.

The figures are not exhaustive and do not limit the present disclosure to the precise form disclosed.

DETAILED DESCRIPTION

As alluded to above, customizing vehicles by adding one or more accessories could permanently damage a vehicle, such as a vehicle panel assembly, or negatively impact the vehicle's long term durability. The reason is that vehicle panel assemblies and exterior panels are not separable from the vehicle body. Moreover, exterior panels are not separable from inner panels or interior trim panels. Accessories which offer some functionality relative to/regarding a surface of the exterior panel could cause damage to one or more of the exterior panel, the inner panel, the interior trim panel, or another portion of the vehicle body. For example, adding an accessory to an exterior surface of an exterior panel could dent or crack the exterior panel. Moreover, it could present a hazard to occupants of the vehicle in the case of a crash.

Therefore, and in accordance with various embodiments, one or more customized vehicle panel assemblies are disclosed which allow for customized panels which can include one or more vehicle accessories to be selectively attached to the vehicle, while also maintaining the safety and structural integrity of the vehicle.

A customizable panel assembly 100 of a vehicle according to an embodiment of the present disclosure is described below with reference to the attached drawings. As shown in the cut-away perspective view in FIG. 1, the customizable panel assembly 100 can include an inner panel 104, one or more fastening joint 110 (110a, 110b are shown), one or more removable fastener 115, a customizable exterior panel 120, and a non-customizable exterior panel 125. The customizable panel assembly 100 can be configured such that, if the customizable exterior panel 120, the inner panel 104, or both customizable exterior panel 120 and the inner panel 104 are not deformed or substantially deformed, an inter-panel region 135 is established between the customizable exterior panel 120 and the inner panel 104.

The exterior panel 120 can be made of resin. The use of resin can reduce the mass of the exterior panel 120, and thus the customizable panel assembly 100. This reduction in mass can translate into an overall reduction in vehicle mass, which can aid in improving fuel economy and braking, for example. Additionally, the reduced mass of the exterior panel can allow for easier manipulation by a user (e.g. for removing the exterior panel 120) or, if part of a door, easier actuation by a power/assisted door mechanism. The use of resin can further provide production efficiency improvements and the ability to create one or more customized panel surfaces (e.g. for aerodynamic and visually appealing surfaces).

However, as also noted above, resin panels used in vehicles may be susceptible to cracking, especially in the event of a collision. Thus, gaps may be created through the resin door panels. This can be especially true in the case of resin panels in vehicles that have been retrofitted with after-market accessories. Such retrofits can expose the exterior panels to direct loads during use of the accessory or during a collision. Further, when panels are resin, those direct loads can crack the resin creating a gap(s) that may expose the interior cabin/passenger compartment.

The exterior panel 120 can be selectively coupled to or decoupled from the customizable panel assembly 100. Selectively coupling or decoupling the exterior panel 120 to/from the customizable panel assembly may allow for one or more customized exterior panels 120 to be replaced, so that one or more visually appealing or otherwise customized exterior panels 120 can be coupled to the vehicle. As shown, if the customizable exterior panel 120 is selectively removed from the customizable panel assembly 100, the inter-panel region 135 can be accessible.

The customizable exterior panel 120 can be coupled to (and decoupled from) the customizable panel assembly 100 by one or more fastening joint(s) 105 (105a, 105b shown). For example, there can be one, two, three, four, six, eight, ten, etc. fastening joints 105 to couple the customizable exterior panel 120 to the customizable panel assembly 100. These fastening joints 105 can be arranged in an array, for example, a one by two or a two by two array. The one or more fastening joints 105 can be positioned at or along the exterior panel 120, between the exterior panel 120 and the rest of the vehicle body. Each fastening joint 105 can couple to the exterior panel 120 at an attachment point of the exterior panel 120. The attachment point can include one or more raised or dimpled surfaces of the exterior panel 120. The attachment point can include or be part of a reinforced member of the exterior panel 120. Similarly, the inner panel 104, or another panel can include an attachment point and/or reinforced members. The whole of the customizable exterior panel 120 can be attached or removed (i.e. by however many fastening joints 105) at a time. The customizable exterior panel 120 can be removed one portion at a time, for example, by one or more fastening joint 105 or respective attachment point at a time.

As discussed previously, the exterior panel 120 can be selectively coupled to the fastening joint 105 and thus the rest of the customizable panel assembly 100. The fastening joint 105 may anchor or tether the exterior panel 120 to the inner panel 104. The fastening joint 105, including for example a spacer or bracket, may be used to reinforce the exterior panel 120 or inner panel 104. The fastening joint 105 can keep the exterior panel 120 in place, and keep the exterior panel 120 connected to the vehicle body, the customizable panel assembly 100, or portion(s) thereof, e.g., the inner panel 104, the interior trim panel, a frame structure of the vehicle body (e.g. a door frame) and/or other component(s). The fastening joint 105 can include a spacer or bracket or be part of a spacer or bracket. The fastening joint 105, spacer or bracket can be shaped such that the fastening joint can absorb or aid in the absorption of impact forces/large deformation while maintaining the position of the exterior panel 120, the inner panel 104, and any other panel(s). For example, it can include at least one shaped member, such as a shaped truss, square beam, L bracket, I beam, H beam, triangular truss, hexagonal truss, etc. Thus, the fastening joint 105 can directly aid in impact or direct load buffering. The fastening joint 105, spacer or bracket can have one or more apertures along one or more axis for maintaining rigidity, strength, and/or flexibility.

The fastening joint 105 can be coupled to or include one or more removable fastener 115. It is understood that the fastening joint 105 together with the removable fastener 115 can create a non-permanent joint, that is, a joint that can be removed or dismantled without damaging the joining components and the joined components. For example, the fastener 115 and the fastening joint 105 can include a hook and loop or hook and pin, respectively, for a hook and loop or hook and pin type joint. Alternatively, the non-permanent joint can be formed by rail (such as DIN rail) and clip. As other examples, the fastener 115 or the fastening joint 105 can include a rail, bolt, screw, buckle, cam, chain, clasp, clip, pin, flange, grommet, clevis, shackle, or hanger. For example, a fastener 115 can include a bolt (and nut), which can pass at least partially through the exterior panel 120 (e.g. at a bolt thru-hole, not shown), and through the fastening joint 105 (e.g. at a bolt thru-hole). Alternative joining materials or methods of creating the non-permanent joint can include: crimping, taping, gluing, non-permanent cement, or the use of other adhesives. Force may also be used, such as with magnets, vacuum (like suction cups), or even friction (like sticky pads). The fastening joint 105 facilitate one or more articulation, such as for easier removal or other articulation of the customizable exterior panel 120. As such, the fastening joint 105 or fastener 115 can include one or more springs (e.g. mechanical or hydraulic) or hinges. Moreover, the fastening joint 105 could include rack and pinion, a scissor mechanism, or other mechanism. Moreover, the assembly 100 can include one or more motorized components, such as DC motor, and respective energy source, such as a battery, to effectuate the actuation.

The removable fastener 115 can removably couple the exterior panel 120 to the fastening joint 105. The removable fastener 115 can be removable with respect to the fastening joint 105. The removable fastener 115 can be removable with respect to the exterior panel 120. The removable fastener 115 can be fixedly attached to the exterior panel 120. Similarly, the fastening joint 105 can selectively couple the inner panel 104 and/or another panel to the fastening joint 105. The removable fastener 115 can be accessible from outside the vehicle body (i.e. from a side of the exterior panel 120 exterior to the exterior panel 120). The removable faster 115 can allow the exterior panel 120 to be selectively decoupled from the fastening joint 105, while being accessed or manipulated by the exterior panel 120. In some embodiments, the fastening joint 105 can remain fixedly attached to the vehicle body and customizable panel assembly 100, while the exterior panel 120 can be removably coupled to the fastening joint 105 and the rest of the customizable panel assembly 100 and the vehicle body.

The interior trim panel(s) (not shown in FIG. 1) can be in the place of the inner panel 104, or in addition to the inner panel 104. The interior trim panel(s) can act as a protective interior covering or shield that eliminates any exposure of the interior cabin/passenger compartment from any exterior (and/or inner) panel cracks/gaps that may be created during an adverse event, such as a collision. Moreover, conventional interior trim panels may, during a collision, break apart, the broken pieces becoming potentially dangerous projectiles. By being attached to the door structure and/or door componentry (e.g. by the fastening joint 105), the chance that the interior trim panel (or portions thereof) becoming a projectile is negated or at least lessened. In some embodiments, the interior trim panel can be constructed in a way and/or using a material(s) that enables it to maintain its form/structure without breaking apart, further enhancing its ability to act as a barrier or shield. Further still, the one or more fastening joints can be configured in such a way that they can absorb or aid in the absorption of impact forces/ large deformation while maintaining the position of the exterior panel 120, the inner panel 104, and the interior trim panel(s). In this way, the aforementioned advantages associated with the use of resin doors can be achieved while still ensuring the passenger compartment is protected.

The customizable exterior panel 120 being removable from at least a portion of the customizable panel assembly 100, which can allow for one or more customizable exterior panels 120 to be alternated, changed, or otherwise swapped out. This can solve the aforementioned problems (such as with respect to the long term durability of the vehicle and minimizing defects at the exterior panel), while allowing a specific (i.e. local to a portion of the vehicle), or overall shape of the vehicle to be customized. Moreover, the vehicle can have one or more functionality by one or more accessories which can be part of the customizable exterior panel. This can allow the overall visual or functional appeal of the vehicle to be altered without compromising on vehicle durability or safety.

The customizable exterior panel 120 can be any panel of a vehicle, similarly the customizable panel assembly 100 can include any panel assembly of a vehicle. As such, it may be useful to show the customizable exterior panel 120 and customizable panel assembly 100 in a vehicle context, for example, as part of a quarter panel of a vehicle, such as a truck.

Before describing further implementations, it may be necessary to describe the customizable panel assembly with reference to the context of a vehicle, and contrast the customizable panel assembly 100 to typical assemblies of conventional vehicles.

Figure 2A:
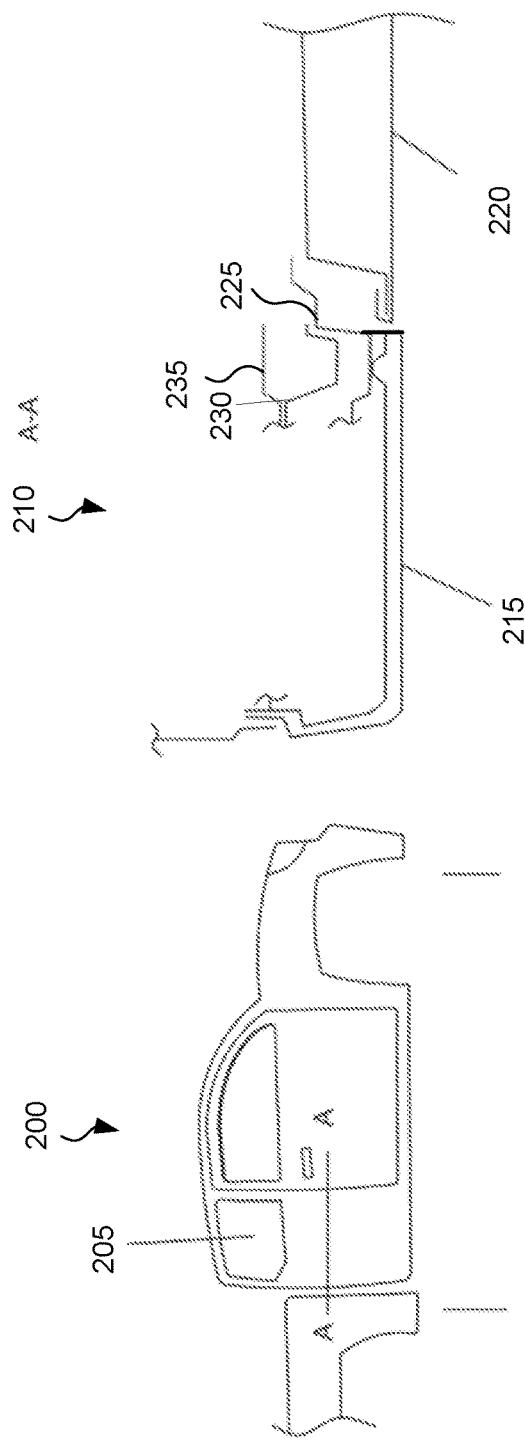
FIG. 2A shows a perspective view of a prior vehicle with a prior quarter panel, and a cut-away perspective view of the prior vehicle.
Figure 2B:
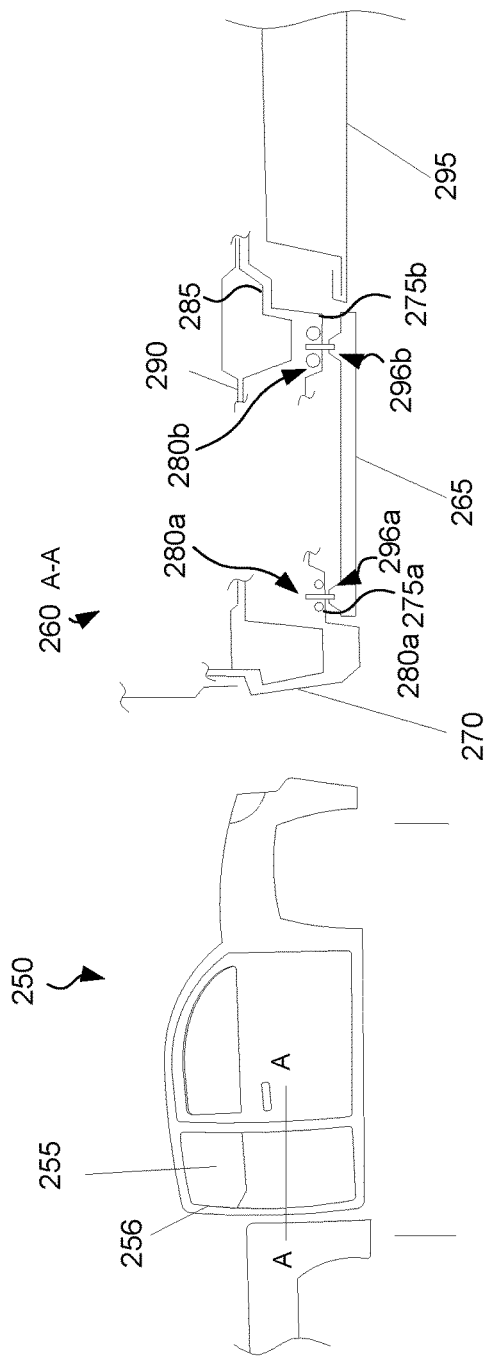
FIG. 2B shows a perspective view of a vehicle with a customized quarter panel, and a cut-away perspective view of the vehicle.

FIG. 2A shows a perspective view of a conventional vehicle 200 with a typical quarter panel assembly 205, and a cut-away perspective view 210 of the prior vehicle 200. FIG. 2B shows a perspective view of a vehicle 250 with a customizable quarter panel assembly 255, and a cut-away perspective view 260 of the vehicle 250.

The cut-away perspective view 210 can be along line A-A shown at the prior vehicle 200. The prior vehicle 200 with a prior quarter panel 205, as shown, can have fixed exterior panel 215 positioned next to a vehicle door assembly 220. The fixed exterior panel 215 can be fixedly attached to or integral to (i.e. integrated with) fixed attachment joint 225 or spacer positioned between the fixed exterior panel 215, an inner panel 230 and an interior trim panel 235. In other words, although spacer 225 is shown for reference, it can be understood that the prior quarter panel 205 does not include (at least separate) fixed attachment joint 225, because fixed exterior panel 215 is integral to or fixed to the fixed attachment joint 225 or spacer. As such, the fixed exterior panel 215 is not selectively removable and cannot be customized. Moreover, the inter-panel region, an inner panel 230, and the interior trim panel 235 are not, e.g. selectively, accessible (i.e. from the exterior of the vehicle 200).

Comparing the conventional vehicle 200 and typical quarter panel assembly 205 of FIG. 2A with the vehicle 250 and the customizable quarter panel assembly 255 shown in FIG. 2B (and with customizable panel assembly 100 described with reference to FIG. 1) the vehicle 255 and customizable quarter panel assembly 255 of FIG. 2B (or customizable panel assembly 100 of FIG. 1), can have a removable customizable exterior panel 265 (or customizable exterior panel 120 shown in FIG. 1), which contrasts with fixed (an thus not removable) exterior panel 215 shown in FIG. 2A. Further, the customizable quarter panel assembly 255 and 100, can have accessible inter-panel region, inner panel, and/or interior trim panel (i.e. from an exterior of the vehicle), compared to prior inter-panel region, inner panel 230, and the interior trim panel 235 shown in FIG. 2B which are not accessible. The cut-away perspective view 260 shown in FIG. 2A can be along line A-A shown at the vehicle 250. The vehicle 250 can have the customizable exterior panel 265, fixed exterior panel 270, one or more fastening joint 275 (fastening joint 275a, 275b shown), one or more or more removable fastener 280 (fastener 280a, 280b shown), an inner panel 285, inner trim panel 290, which can all be part of the customizable quarter panel assembly 255.

As shown and contrasted in in FIG. 2B, the customizable quarter panel assembly 255 can also include a window 256 or other transparency which can allow a line of sight visibility from an interior of the vehicle 200 (such as the cabin of the vehicle 200) to the exterior surrounding of the vehicle 200. The window 256 or other transparency can be disposed in a frame of the customizable quarter panel assembly 255.

As alluded to in the cut-away perspective view 260, by way of the discontinuities, one or more fastening joints 275a, 275b can be coupled to each other, for example, they can be at opposite ends of a spacer, a bracket, or the inner panel 285. The vehicle 255 can also include door assembly 295. The customizable quarter panel assembly 255 can be the same or similar to the customizable panel assembly 100 shown in FIG. 1.

In other words, although customizable panel assembly 100 is not intended to only represent a quarter panel assembly (i.e. it can represent other vehicle panels), in the context of a vehicle quarter panel assembly, FIG. 1 can show another cut-away perspective view along line A-A of vehicle 250.

Now referring back to FIG. 2B, as shown in the cut-away perspective view 260, the customizable exterior panel 265 can be removable (i.e. selectively removable) with respect to the rest of the customizable quarter panel assembly 255. As shown, if the customizable exterior panel 265 is removed, the inner panel 285 and/or the interior trim panel 290 can be accessible. Similarly, an inter-panel region (i.e. inter-panel region 135 shown in FIG. 1) can be accessible. As shown in the cut-away perspective view 260, the customizable exterior panel 265 and the one or more fastening joint (e.g. fastening joint 275a) can also be coupled to the fixed exterior panel 270. As shown in the cut-away perspective view, the fastening joint 275 can be coupled to an attachment point 296 (296a, 296b shown), which can be a reinforced portion of the customizable exterior panel 265. In the embodiment of the customizable quarter panel assembly 255, each of the customizable exterior panel 265, and the fixed exterior panel 270 can be shaped to resemble respective portions of the quarter panel (such as rear passenger side quarter panel).

Figure 3:
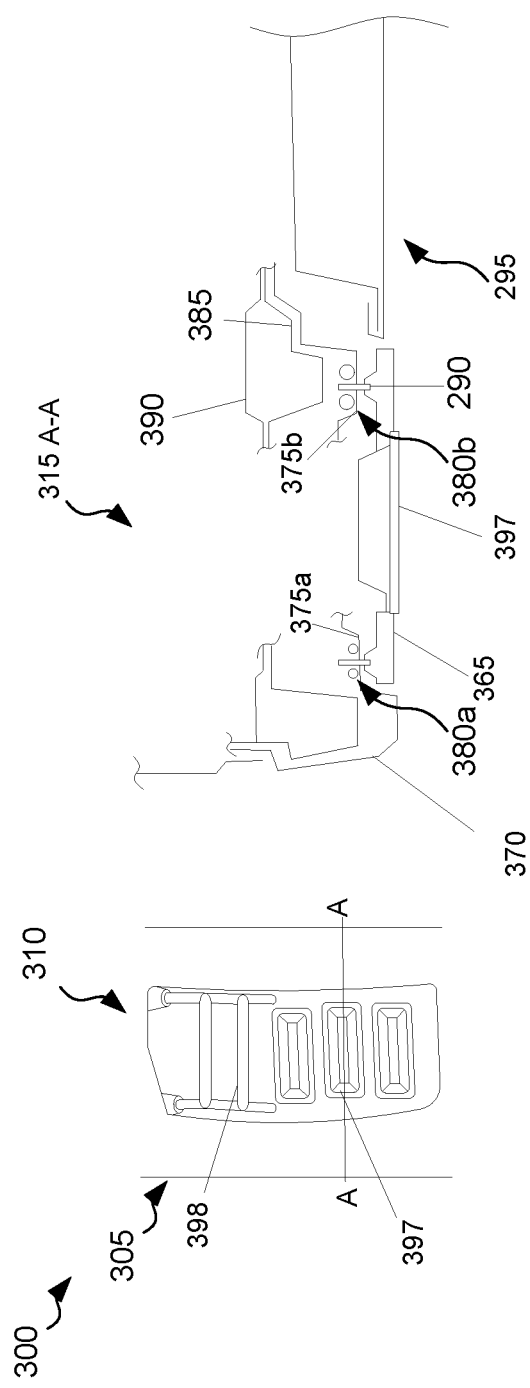
FIG. 3 shows a perspective view of a vehicle with customized panel having a ladder accessory, and a cut-away perspective view of the vehicle.
Figure 4:
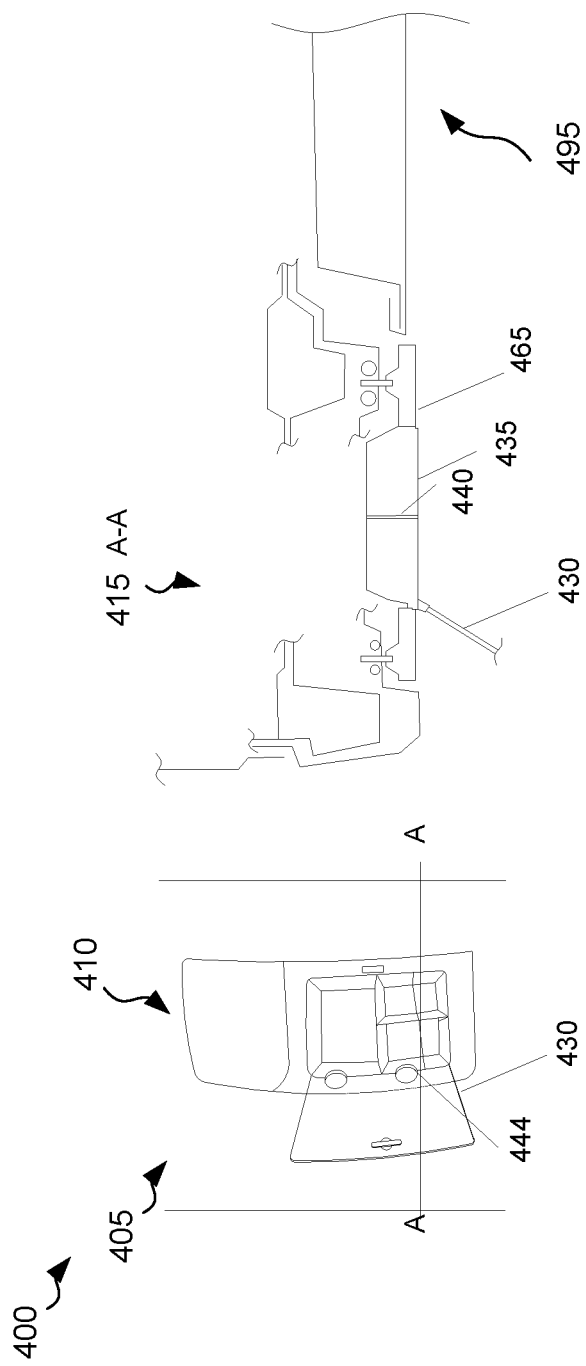
FIG. 4 shows a perspective view of a vehicle with customized panel having a storage compartment accessory, and a cut-away perspective view of the vehicle.
Figure 5:
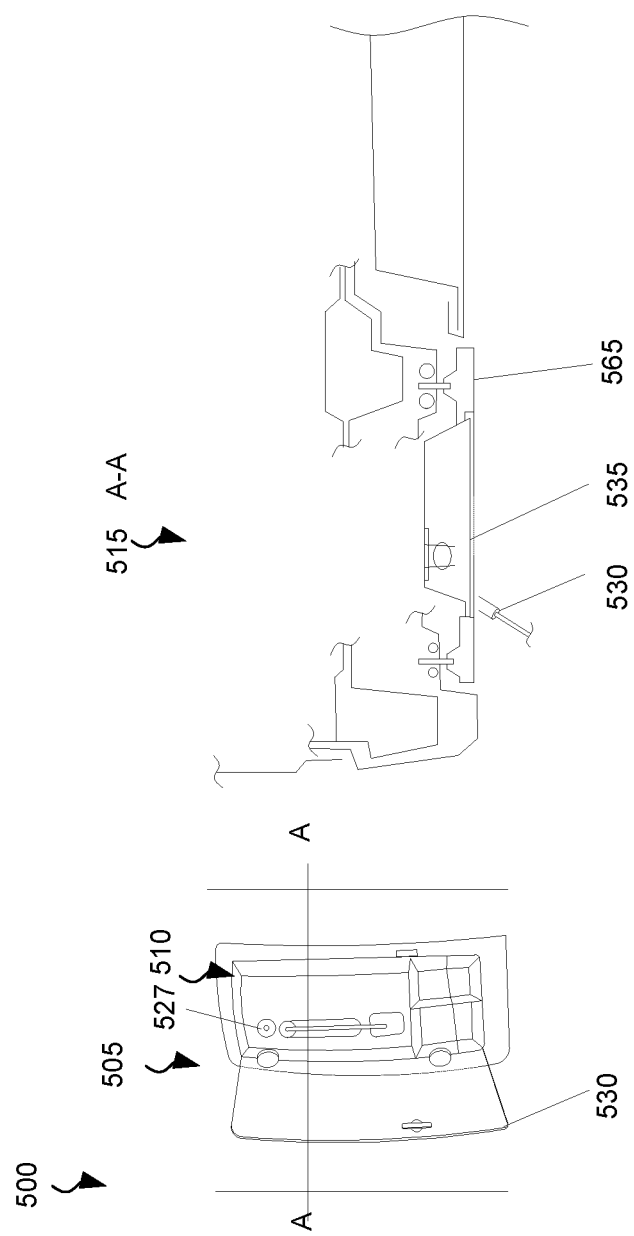
FIG. 5 shows a perspective view of a vehicle with customized panel having another type of storage compartment accessory, and a cut-away perspective view of the vehicle.

As previously discussed, the customizable exterior panel or customizable panel assembly can be outfitted with one or more accessory. The one or more accessory can be positioned at or along one or more positions of the customizable exterior panel. The one or more accessory can be part of the customizable exterior panel, in that the customizable exterior panel can be shaped so as to have a visual appeal and/or functionality of one or more accessory. Moreover, the accessory can be integral to the exterior panel, such that the accessory can add to the impact or direct load buffering of the vehicle. For example, the accessory can be shaped such that the accessory can absorb or aid in the absorption of impact forces/large deformation. As another example, the accessory can have one or more surfaces and apertures which create safety crumple zones or otherwise facilitate impact or direct load buffering. The one or more accessory can be at least partially positioned closer to an interior of the vehicle than an outer surface of the customizable exterior panel. The one or more accessory can be at least partially positioned closer to an interior of the vehicle than the attachment point of the customizable exterior panel. The one or more accessory can also be positioned in the inter-panel region (e.g. inter-panel region 135). For example, the one or more accessory can be separate to the customizable exterior panel, but positioned behind the customizable exterior panel (for example, by being coupled to or part of the inner panel or the fastening joint) and be accessible by removing the customizable exterior panel. For example, an inter-panel accessory can include a storage compartment (e.g. for roadside assistance equipment), plumbing, fire-suppressant, and/or electrical equipment which can be accessible by removing the customizable exterior panel. The accessory can add one or more functionality to the vehicle, or otherwise alter the visual appeal of the vehicle. It may be useful to show one or more accessory. FIG. 3, FIG. 4, and FIG. 5 are similar to FIG. 1 and FIG. 2B in that they show customizable panel assemblies, however, they show example accessories which can be included as part of the customizable panel assemblies or customizable exterior panel of the customizable panel assemblies.

FIG. 3 shows a perspective view of a portion of a vehicle 300 having a customizable panel assembly 305 which can include a ladder accessory 310, and a cut-away perspective view 315 of the customized panel assembly 300. The cut-away perspective view 315 can be taken along line A-A shown at the perspective view. The customizable panel assembly 300, can be the same or similar to customizable panel assembly 100 and customizable quarter panel assembly 255, however, it can have the ladder accessory 310.

The customizable panel assembly 305 can include one or more removable customizable exterior panels 265 selectively coupled to one or more fastening joint (fastening joint 375a, 375b shown) by removable fasteners (fasteners 380a, 380b shown). Like other customizable panel assemblies discussed, the customizable panel assembly 305 can include one or more fixed panel 370, inner panel 385 and interior trim panel 390. As also shown in the cut-away perspective view 315 of FIG. 3, the vehicle 300 can also include a door assembly 395.

The customizable exterior panel 365, and the ladder accessory 310, can include one or more steps 397. As shown in the cut-away perspective view 315, the one or more steps can be internally depressed (i.e. into a center of the vehicle body). The one or more steps can also be externally raised, i.e. away from a center of the vehicle body. The one or more steps can have one or more support surfaces positioned substantially perpendicular (i.e. within 60-120 degrees) to an outer surface of the customizable exterior panel 365. For example if the surface of the customizable exterior panel 265 run into the page, the surface of the step would be up and down along the page. The support surfaces can facilitate one or more functionality, such as a user contacting the step 397 to climb to access the roof of the vehicle. Moreover, the one or more steps 397 can further allow the customizable panel assembly 300 to absorb or aid in the absorption of impact forces/large deformation. Similarly, the customizable exterior panel 365 can include one or more support members which can be or function as rungs 398 of the ladder accessory 310.

FIG. 4 shows a perspective view of a portion of a vehicle 400 with customized exterior panel assembly 405 having a customized exterior panel 465 which has a a storage compartment accessory 410, and a cut-away perspective view 415 of the portion of the vehicle 400. The cut-away perspective view 415 can be along line A-A shown at the left side of FIG. 4. The storage compartment accessory 410 can include a compartment door 430, and one or more compartments 435 which can be separated be one or more shelfing or dividers 440. The one or more compartments 435, shelfing, and dividers 440 can assist in the absorbing or transferring one or more loads or deformations applied at the exterior panel assembly 405. The compartment door 430 can include a locking mechanism, and a handle for easy manipulation of the compartment door 430. The storage compartment accessory 410 can be part of the customizable exterior panel 465. The whole of the customizable exterior panel 465, including the storage compartment accessory 410, can be selectively removable with respect to the rest of the customizable vehicle assembly 405 and the body of the vehicle 400.

As shown in FIG. 4, the compartment door 430 can be a flip out door which can be pivotably attached to the customizable exterior panel 465, for example, by one or more hinges (a pair of hinges 444 are shown). When the compartment door 430 is closed, the compartment door 430 can be coplanar with or flush with the outer surface of the customizable exterior panel. There can be more than one compartment door 430. It is understood that the compartment door can be a flip up, flip down, etc.

FIG. 5 shows a perspective view of a portion of vehicle 500 with customized panel assembly 505 having another storage compartment accessory 510, and a cut-away perspective 515 view of the vehicle 500. The cut-away perspective 515 can be along line A-A shown in the left hand of FIG. 5. Compared to the storage compartment accessory 410 shown in FIG. 4, the storage compartment accessory 510 shown in FIG. 5 can be larger (e.g. in length and depth). The storage compartment accessory 510 can include an attachment mechanism 527 for one or more items to be stored, such as work equipment. Similar to the storage compartment accessory 410, the storage compartment accessory 510 can include one or more shelfing or dividers, one or more compartment doors 530, and one or more compartment 535.

It should be noted that various methods of connection to an exterior panel, inner panel, interior trim panel, and/or other vehicle panel(s) or like component(s) are contemplated and not limited to embodiments explicitly described herein. Moreover, various shapes/configurations of the panels, the fastening joints, are also contemplated and not limited to embodiments explicitly described herein. For example, depending on the various surfaces of, e.g., an exterior trunk door panel, an exterior quarter panel, an exterior door panel, and interior trim panel, mechanisms for selective coupling and decoupling, adjustment, and/or locking mechanisms, etc., and the shape of the fastening joint, fasteners, or portions of panel assemblies can vary to accommodate such variations. Additionally, the amount of deformation absorption, the distance between the respective surfaces of the various structural components (such as exterior panel, the inner panel, and interior trim panels) may also dictate, at least in part, the shape of the various structural components (such as fastening joints, spacers, brackets, the panels, and the accessories). That is, the accessory or customizable exterior panel may in one embodiment be shaped to accommodate a greater inter-panel distance than in another embodiment. In another embodiment, expected loads or deformations may dictate the relative positioning and shapes of the various structural components described herein. In another embodiment, the fastening joint and fastener may be configured to attach to an interior-facing surface of the customizable exterior panel. In another embodiment, the fastening joint and fastener may be configured to a side portion of the exterior panel, or to one or more panels (such as an exterior panel an inner panel, and an interior trim panel). In some embodiments, the fastening joint or portions thereof, be sized according to that distance.

Moreover, other materials or combinations of materials used to manufacture the disclosed panels, fastening joints, spacers, accessories, brackets, fasteners, etc. are contemplated, e.g., carbon fiber, fiberglass, polymer, elastomer, aluminum, titanium, etc. Many other variations are contemplated herein and would be understood by those of ordinary skill in the art to retain the novel characteristics and functionality of providing customizable and removable exterior panels to panel assemblies, and providing protection from damage, gaps/cracks in exterior panels, preventing long term damage to fastening joints, as well as providing some impact or direct load buffering.

Further still, although various embodiments of structural components described herein have been described as comprising distinct components, other embodiments contemplate a monolithic components or, other components each comprising more than two components. Moreover, in the case where multiple components, e.g., fastening joint and fastener, make up a joint, the manner and location(s) of connection (e.g. at the exterior panel) can vary as would be readily understood by those of ordinary skill in the art.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional or physical partitioning and configurations can be implemented to implement the desired features of the technology disclosed herein. Also, a multitude of different constituent module names other than those depicted herein can be applied to the various partitions.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A customizable exterior panel assembly, comprising:
a customizable exterior panel configured to be selectively coupled to an inner panel of a vehicle and to a fastening joint of the vehicle wherein the fastening joint:
effectuates selective coupling of the customizable exterior panel to the inner panel and selectively attaches to an attachment point of the customizable exterior panel for selective coupling of the customizable exterior panel by the attachment point to the fastening joint;

is shaped to distance the customizable exterior panel from the inner panel at a portion of the customizable exterior panel where the attachment point is incorporated; and provides at least one of impact force absorption and transference of impact force from the customizable exterior panel through the customizable exterior panel.

2. The customizable exterior panel assembly of claim 1, wherein the customizable exterior panel is shaped such that an aperture is formed between the inner panel and the customizable exterior panel; wherein when the customizable exterior panel is selectively decoupled from the inner panel, the aperture is accessible.

3. The customizable exterior panel assembly of claim 1, wherein the inner panel comprises an interior trim panel of a vehicle.

4. The customizable exterior panel assembly of claim 1, wherein the customizable exterior panel comprises an accessory, wherein the accessory is at least partially positioned closer to the inner panel of the vehicle than an apex of outer surface of the customizable exterior panel.

5. The customizable exterior panel assembly of claim 4, wherein the accessory is configured for at least one of impact force absorption and transference of impact force from the exterior panel through the customizable exterior panel assembly.

6. The customizable exterior panel assembly of claim 5, wherein the accessory comprises a step comprising one or more support surfaces positioned substantially perpendicular to an outer surface of the customizable exterior panel.

7. The customizable exterior panel assembly of claim 4, wherein the accessory comprises a storage compartment comprising one or more surfaces positioned substantially perpendicular to an outer surface of the customizable exterior panel.

8. The customizable exterior panel assembly of claim 7, wherein the storage compartment comprises a compartment door pivotably attached to the customizable exterior panel.

9. The customizable exterior panel assembly of claim 1, wherein the customizable exterior panel is shaped as a vehicle quarter panel.

10. A customizable exterior panel assembly, comprising:
a customizable exterior panel configured to be selectively coupled to an inner panel of a vehicle and to a fastening joint of the vehicle;
wherein the customizable exterior panel comprises an accessory, wherein the accessory is at least partially positioned closer to the inner panel of the vehicle than an apex of outer surface of the customizable exterior panel; and
wherein the accessory is configured for at least one of impact force absorption and transference of impact force from the exterior panel through the customizable exterior panel assembly.

11. The customizable exterior panel assembly of claim 10, wherein the accessory comprises a step comprising one or more support surfaces positioned substantially perpendicular to an outer surface of the customizable exterior panel.

12. A customizable exterior panel assembly, comprising:
a customizable exterior panel configured to be selectively coupled to an inner panel of a vehicle and to a fastening joint of the vehicle;
wherein the customizable exterior panel comprises an accessory, wherein the accessory is at least partially positioned closer to the inner panel of the vehicle than an apex of outer surface of the customizable exterior panel; and
wherein the accessory comprises a storage compartment comprising one or more surfaces positioned substantially perpendicular to an outer surface of the customizable exterior panel.

13. The customizable exterior panel assembly of claim 12, wherein the storage compartment comprises a compartment door pivotably attached to the customizable exterior panel.

* * * * *